United States Patent
Lin et al.

(10) Patent No.: US 12,510,995 B1
(45) Date of Patent: Dec. 30, 2025

(54) TOUCH PANEL AND CONTROL METHOD THEREOF

(71) Applicant: Novatek Microelectronics Corp., Hsinchu (TW)

(72) Inventors: Chung-Cher Lin, Hsinchu County (TW); Jyun Yu Jhang, Kaohsiung (TW); Yun-Hsiang Yeh, Hsinchu (TW); Ta-Keng Weng, Taichung (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/929,655

(22) Filed: Oct. 29, 2024

(51) Int. Cl.
  *G06F 3/041* (2006.01)
  *G06F 3/0354* (2013.01)
  *G06F 3/038* (2013.01)

(52) U.S. Cl.
  CPC ...... *G06F 3/04182* (2019.05); *G06F 3/03545* (2013.01); *G06F 3/0383* (2013.01); *G06F 3/04162* (2019.05); *G06F 3/04166* (2019.05)

(58) Field of Classification Search
  CPC ............. G06F 3/04182; G06F 3/03545; G06F 3/0383; G06F 3/04162; G06F 3/04166
  See application file for complete search history.

(56) References Cited

U.S. PATENT DOCUMENTS

| | | | |
|---|---|---|---|
| 10,817,085 | B2 | 10/2020 | Chen et al. |
| 2008/0158165 | A1 | 7/2008 | Geaghan et al. |
| 2018/0120961 | A1* | 5/2018 | Liang ............. G06F 3/0412 |
| 2018/0173329 | A1 | 6/2018 | Chen et al. |
| 2019/0004666 | A1 | 1/2019 | Jiang et al. |
| 2022/0043553 | A1* | 2/2022 | Liang ............. G06F 3/03545 |

FOREIGN PATENT DOCUMENTS

| | | |
|---|---|---|
| TW | 201519017 A | 5/2015 |
| TW | 201823936 A | 7/2018 |

OTHER PUBLICATIONS

"Office Action of Taiwan counterpart Application", issued on Nov. 4, 2025, p. 1-p. 3.

* cited by examiner

*Primary Examiner* — Jonathan A Boyd
(74) *Attorney, Agent, or Firm* — JCIPRNET

(57) ABSTRACT

A touch panel and a control method thereof. The control method is applied to a touch panel to receive controls from an active stylus. The control method comprises using a demodulation frequency to demodulate a writing signal received from the active stylus; determining whether a demodulated writing signal is abnormal or not; and in response to determining the demodulated writing signal to be abnormal, adjusting the demodulation frequency to increase an energy of the demodulated writing signal.

16 Claims, 8 Drawing Sheets

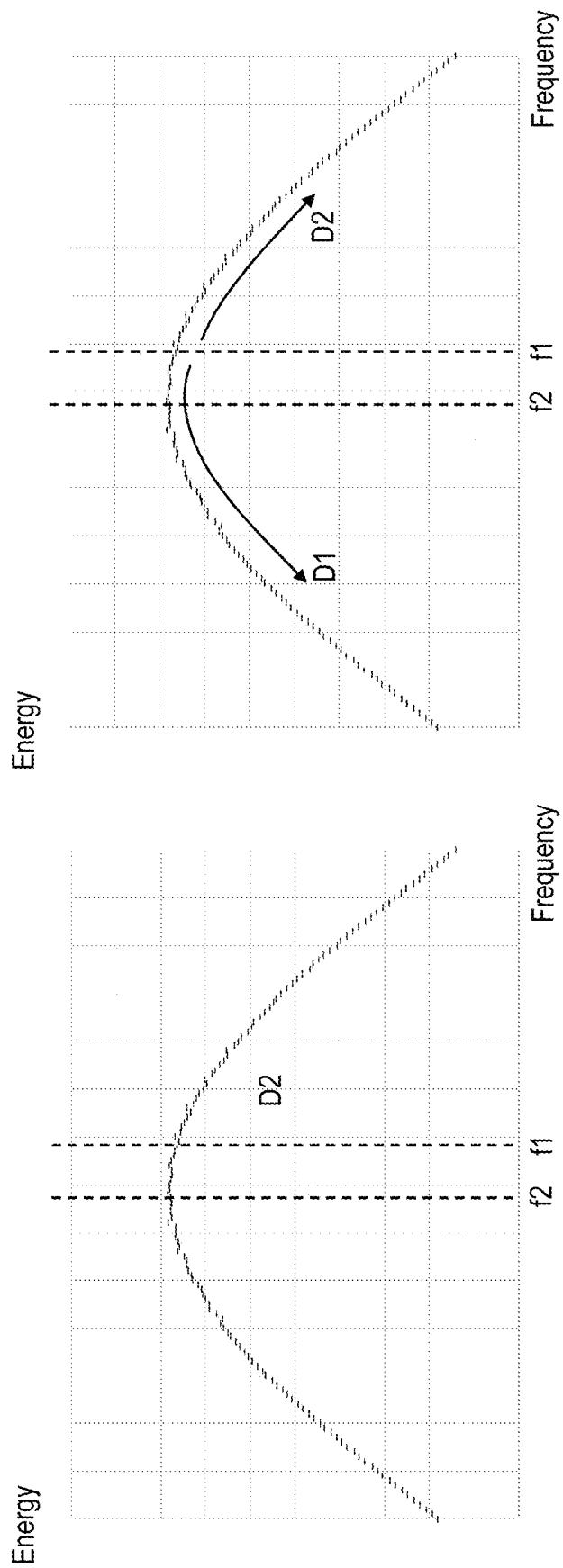

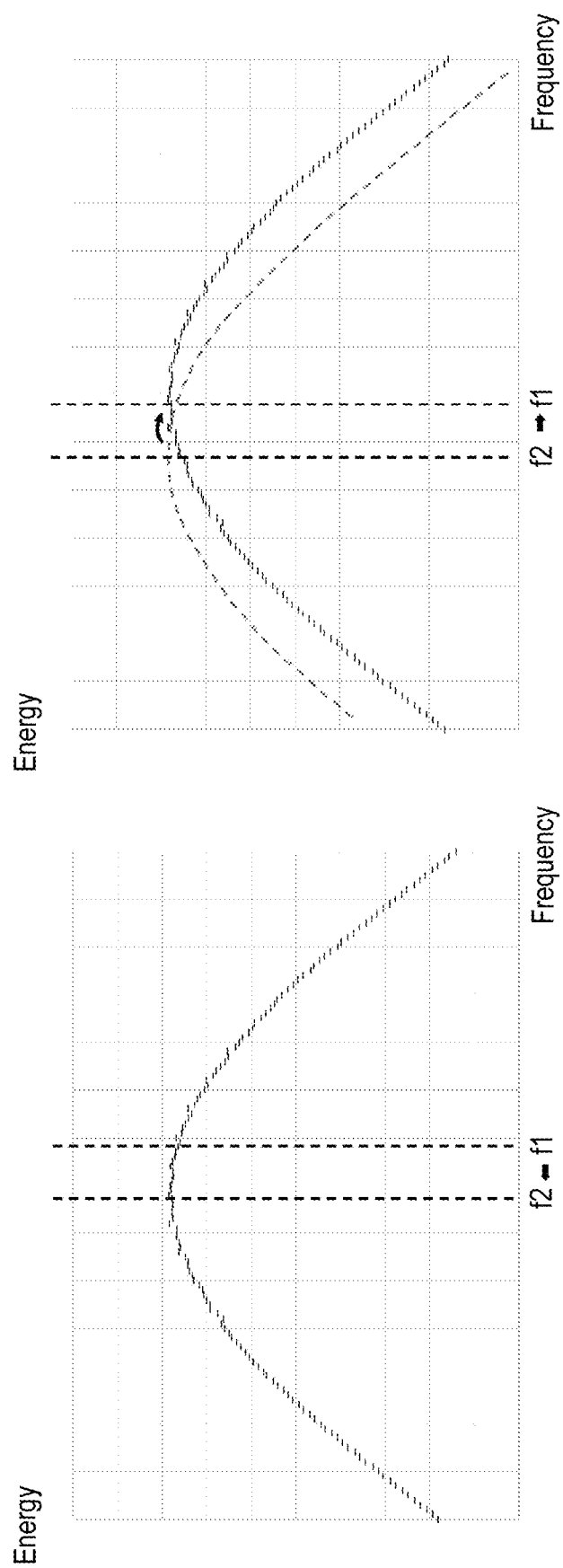

TOUCH PANEL AND CONTROL METHOD THEREOF

BACKGROUND

1. Technical Field

The disclosure generally relates to a panel and a method, and more particularly, to a touch panel and a control method thereof.

2. Description of Related Art

Nowadays, touch controls are widely used in various electronic devices. In particular, using an active stylus for touch can provide better accuracy and better comfort, making it the touch choice for more users.

SUMMARY

Accordingly, the disclosure is directed to a touch panel and a control method for canceling mismatch between modulation and demodulation frequencies.

The control method of the present disclosure is applied for a touch panel to receive controls from an active stylus. The control method comprises using a demodulation frequency to demodulate a writing signal received from the active stylus; determining whether a demodulated writing signal is abnormal or not; and in response to determining the demodulated writing signal to be abnormal, adjusting the demodulation frequency to increase an energy of the demodulated writing signal.

The touch panel of the present disclosure is adapted to receive control from an active stylus. The touch panel comprises a receiver and a processor. The receiver is configured to: use a demodulation frequency to demodulate a writing signal received from the active stylus. The processor is coupled to the receiver. The processor is configured to: determine whether a demodulated writing signal is abnormal or not; and in response to determining the demodulated writing signal to be abnormal, adjust the demodulation frequency to increase an energy of the demodulated writing signal.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 6A illustrates an energy spectrum diagram of the demodulated writing signal demodulated by different demodulation frequencies in accordance with some embodiments of the present disclosure.

FIG. 6B illustrates how the demodulation frequency is scanned in accordance with some embodiments of the present disclosure.

FIG. 6C illustrates how the first frequency is adjusted in accordance with some embodiments of the present disclosure.

FIG. 6D illustrates how the second frequency is adjusted in accordance with some embodiments of the present disclosure.

DESCRIPTION OF THE EMBODIMENTS

Figure 1:
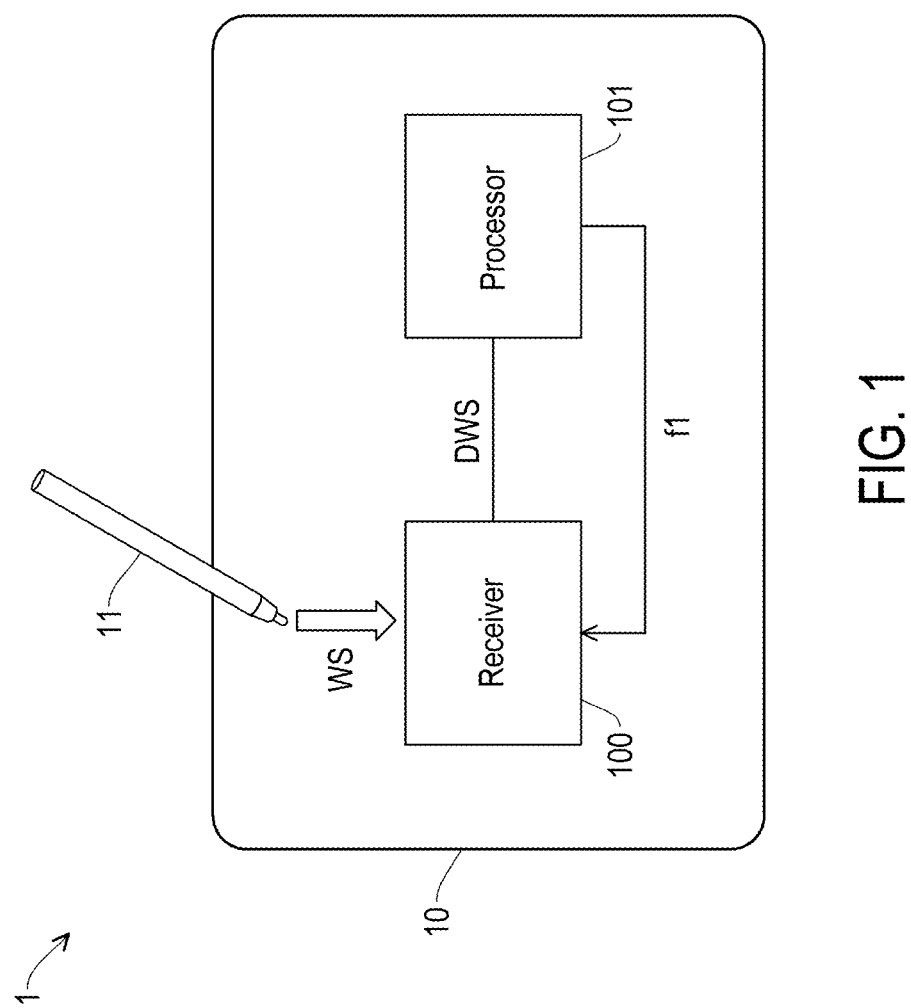
FIG. 1 illustrates a schematic diagram of an electronic system in accordance with some embodiments of the present disclosure.

FIG. 1 illustrates a schematic diagram of an electronic system 1 in accordance with some embodiments of the present disclosure. The electronic system 1 includes a touch panel 10 and an active stylus 11. The active stylus 11 may be disposed with a battery, a transmitter, and necessary processing circuits inside for spontaneously transmitting a writing signal. The touch panel 10 may be configured to receive the writing signal from the active stylus 11 when the active stylus 11 is close to or is touching a sensing surface on the touch panel 10, so that touches from the active stylus 11 may be identified by the touch panel 10 in response to receiving the writing signal. In this way, a user may utilize the active stylus 11 to, for example, select and press a certain button displayed on the touch panel, input to the touch panel 10 through handwriting or hand drawing, etc.

Specifically, the touch panel 10 includes a receiver 100 and a processor 101. The receiver 100 may be configured to receive a writing signal WS from the active stylus 11. The receiver 100 may be configured to use a modulation frequency to demodulate the writing signal WS to generate a demodulated writing signal DWS. Further, the demodulated writing signal DWS may be transmitted to the processor 101 coupled to the receiver 100. The processor 101 may be configured to determine whether there is a writing event going on according to demodulated writing signal DWS, so as to perform corresponding control operations. Further, the processor 101 may be configured to determine whether the demodulated writing signal DWS is abnormal or not. When the demodulated writing signal DWS is determined to be abnormal, the processor 101 may be control the receiver 100 to calibrate the demodulation frequency.

In some embodiments, the writing signal WS transmitted by the active stylus 11 is modulated with a modulation frequency. To verify whether the writing signal WS is transmitted from the active stylus 11, the receiver 100 may be configured to demodulate the received writing signal WS with the demodulation frequency, so that the processor 101 may be configured to confirm whether the active stylus 11 is touching the touch panel 10 according to the demodulated writing signal DWS. The processor 101 may be configured to determine whether there is a writing event occurring based on an energy of the demodulated writing signal DWS. If the energy of the demodulated writing signal DWS is greater than or equal to a threshold energy, the processor 101 may determine that writing signal WS is sent from the active stylus 11 and the active stylus 11 is close enough with the touch panel 10, so a writing event is occurring may be determined. To perform corresponding operations instructed by the writing signal WS, a coordinate information at the point where the writing signal WS is received on the touch panel 10 may also be provided to the process 101 for further control. On the other hand, if the energy of the demodulated writing signal DWS is less than the threshold energy, the processor 101 may determine that the writing signal WS may not be sent from the active stylus 11 or the active stylus 11 is too far from the touch panel 10, so no writing event is occurring may be determined.

Figure 2A:
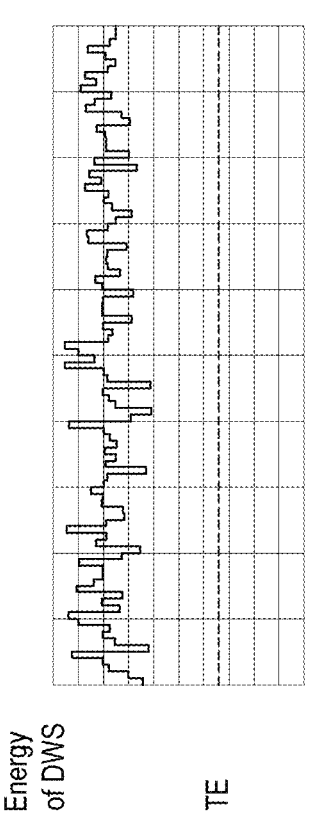
FIGS. 2A-2C illustrate a process of how a handwriting is determined in accordance with some embodiments of the present disclosure.
Figure 2B:
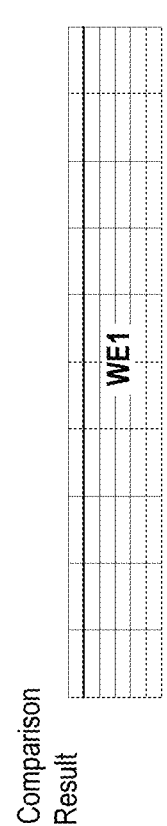
Figure 2C:
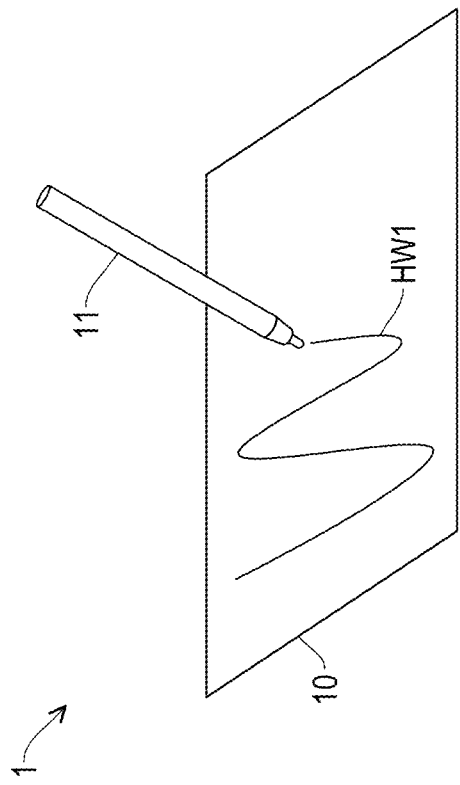

FIGS. 2A-2C illustrate a process of how a handwriting HW1 is determined in accordance with some embodiments of the present disclosure.

When the receiver 100 receives a writing signal WS, the writing signal WS may be demodulated by the receiver 100 with the demodulation frequency to generate demodulated writing signal DWS. Then, the processor 101 may be configured to determine whether there is the writing event occurring by comparing the energy of the demodulated writing signal DWS with a threshold energy TE. As depicted in FIG. 2B, the energy of the demodulated writing signal DWS is kept at a sufficiently high level greater than the threshold energy TE, so the processor 101 may be configured to determine that there is a writing event WE1 going on. Further, the processor 101 may be configured to perform corresponding operations according to the determined writing event and the corresponding coordinate information. In this embodiment, the active stylus 11 may be controlled for performing a drawing or a handwriting operation, so the processor 101 may control a display panel of the touch panel 10 to show a continuous handwriting HW1 as depicted in FIG. 2C.

Figure 3A:
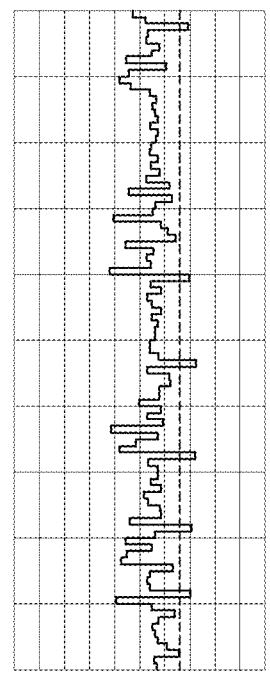
FIGS. 3A-3C illustrate a process of how a handwriting is determined in accordance with some embodiments of the present disclosure.
Figure 3B:
Figure 3C:
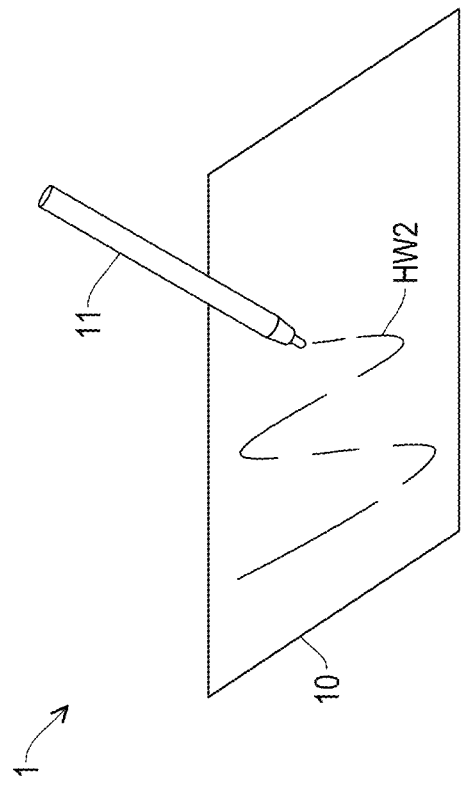

FIGS. 3A-3C illustrate a process of how a handwriting HW2 is determined in accordance with some embodiments of the present disclosure.

In this embodiment, the demodulation frequency used by the receiver 100 to demodulate the writing signal WS may be deviated from the modulation frequency used by the active stylus 11 to modulate the writing signal WS. In this way, the energy of the demodulated writing signal DWS may drop to a lower level. More particularly, the energy of the demodulated writing signal DWS is dropped to be less than the threshold energy TE occasionally. Therefore, when comparing the energy of the demodulated writing signal DWS with the threshold energy TE, the comparison result becomes unstable, which also leads to the determination on the touch events. Specifically, as can be seen in FIG. 3B, based on the comparison between the energy of the demodulated writing signal DWS and the threshold energy TE, the processor 101 may be configured to determine a plurality of writing events WE21-WE26. As a result, in this embodiment, the processor 101 may control the display panel to show an intermittent handwriting HW2 as depicted in FIG. 3C.

In brief, the mismatch between the modulation and demodulation frequencies will affect the energy of the demodulated writing signal to drop, affecting determinations on the writing event by the processor 101. As shown in FIG. 3C, a handwriting HW2 broke into multiple segments as an intermittent line shown on the touch panel 10 due to the frequency mismatch. Therefore, the mismatch between the modulation and demodulation frequencies will cause the touch panel 10 misjudge touches from the active stylus 11, thereby affecting accuracy and sensitivity on touch controls from the active stylus 11 and lowering user experience to the electronic system 1.

Figure 4:
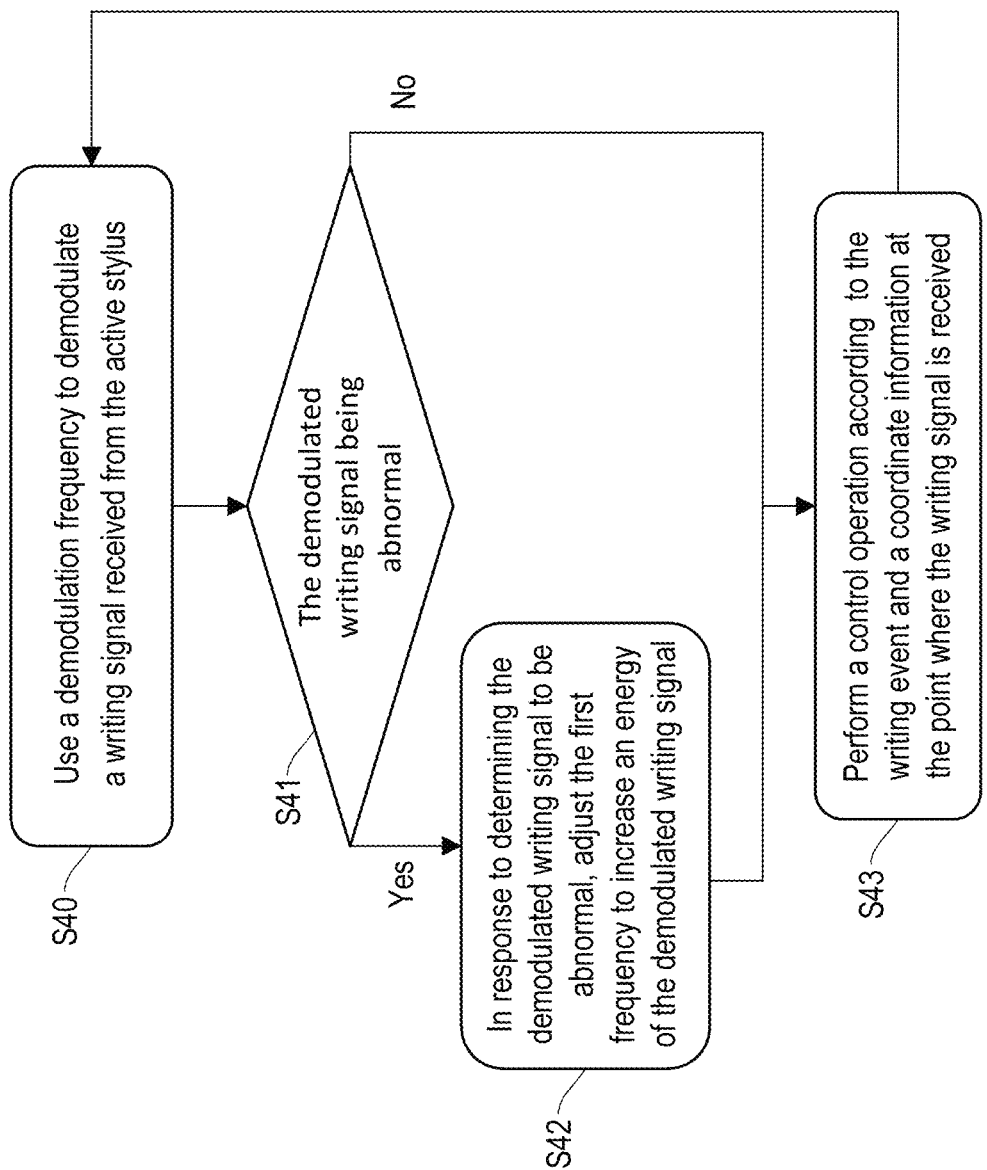
FIG. 4 illustrates a flowchart of a control method in accordance with some embodiments of the present disclosure.

FIG. 4 illustrates a flowchart of a control method in accordance with some embodiments of the present disclosure. The control method in FIG. 4 may be executed by the touch panel 10 in FIG. 1. In brief, the control method may be applied to the electronic system 1 to cancel mismatch between the modulation and demodulation frequencies.

In step S40, the receiver 100 may be configured to demodulate a writing signal WS received from the active stylus 11 with a demodulation frequency. Specifically, the active stylus 11 is configured to modulate the writing signal WS with a modulation frequency, so the receiver 100 is configured to demodulate the writing signal WS to identify whether the writing signal WS is transmitted from the active stylus 11.

In step S41, the processor 101 is configured to determine whether a demodulated writing signal DWS is abnormal or not. If the processor determines that the demodulated writing signal DWS is abnormal, the control method enters step S42. Otherwise, step S43 is entered.

Specifically, the receiver 100 is configured to demodulate the writing signal WS and provide the demodulated writing signal DWS to the processor 101. In some embodiments, the processor 101 may be configured to evaluate whether the demodulated writing signal DWS is abnormal or not according to a contact signal provided from the active stylus 11. Specifically, the active stylus 11 may be equipped with a pressure sensor inside for sensing a pressure at the nib of the active stylus 11, so as to generate the contact signal to the touch panel 10 indicating whether the active stylus 11 is actually touching the touch panel 10. In this way, the processor 101 may be configured to evaluate whether the demodulated writing signal DWS is abnormal or not using the contact signal.

In this embodiment, the processor 101 may be configured to determine whether there is a writing event occurring by comparing an energy of the demodulated writing signal DWS with the threshold energy. When the energy of the demodulated writing signal DWS is greater than or equal to the threshold energy, the processor 101 may be configured to determine that the writing event is occurring which the active stylus 11 is contacting the touch panel 10. On the contrary, when the energy of the demodulated writing signal DWS is less than the threshold energy, the processor 101 may be configured to determine that the writing event is not occurring and the active stylus 11 is not contacting the touch panel 10.

To evaluate the demodulated writing signal DWS, the processor 101 may be configured to compare the determination of the writing event and the contact signal to see whether the writing event being consistent to the contact signal. Specifically, when it is determined that the writing event is occurring and the contact signal also indicates that the active stylus 11 is actually touching the touch panel 10, the processor 101 may be configured to determine that the demodulated writing signal DWS is normal. On the contrary, when it is determined that the writing event is not occurring but the contact signal indicates that the active stylus 11 is touching the touch panel 10, the processor 101 may be configured to determine that the demodulated writing signal DWS is abnormal. In other words, the contact signal may be used as a reference to verify whether the determination on the writing event is correct to reflect whether the demodulated writing signal DWS is abnormal.

In step S42, in response to determining the demodulated writing signal DWS to be abnormal, the processor 101 may be configured to adjust the demodulation frequency to increase an energy of the demodulated writing signal DWS. In some embodiments, the abnormal demodulated writing signal DWS may have a lower energy level caused by a mismatch between the first and second frequencies has a lower energy. The lowered energy level of the modulated writing signal DWS made the processor 101 to misjudge the writing event. In this way, the processor 101 may be configured to adjust the demodulation frequency to match the modulation frequency, and cancel the mismatch between them.

coordinate provided along with the demodulated writing signal DWS.

Figure 5A:
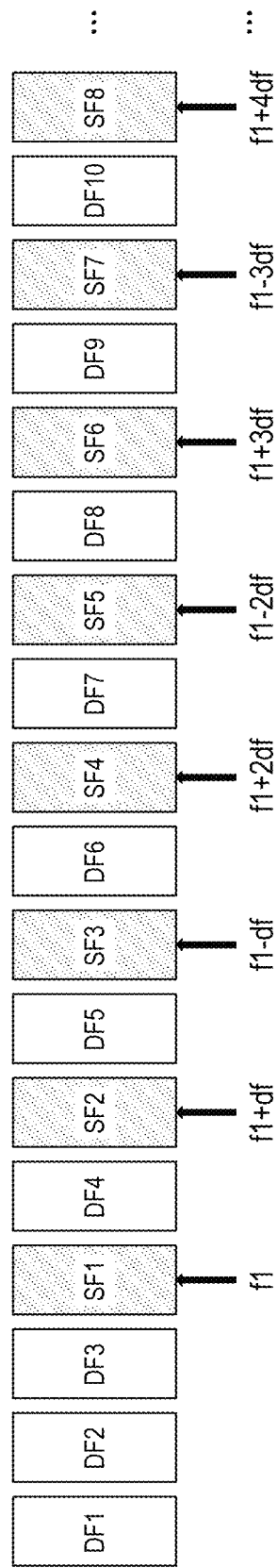
FIG. 5A illustrates a timing diagram of when the touch panel senses the writing signal WS in accordance with some embodiments of the present disclosure.

FIG. 5A illustrates a timing diagram of when the touch panel 10 senses the writing signal WS in accordance with some embodiments of the present disclosure. In FIG. 5A, a plurality of display frames DF1-DF10 are sequentially arranged, and the touch panel 10 is configured to display a corresponding image in each display frame. In addition to the display frames DF1-DF10, a plurality of stylus sensing frames SF1-SF8 are inserted and each stylus sensing frame is inserted between two display frames. In each stylus sensing frame, the touch panel 10 is configured to sense the writing signal WS for performing corresponding control operations.

As can be seen in FIG. 5A, in a first stylus sensing frame SF1, the processor 101 may be configured to set the demodulation frequency as a first frequency value f1 for demodulation. If the processor 101 determines that adjustment to the demodulation frequency is required, the processor 101 may apply a frequency offset df to the demodulation frequency and set the demodulation frequency as f1+df in the stylus sensing frame SF2. Similarly, in the following stylus sensing frames SF3-SF8, the processor 101 may iteratively apply the frequency offset df to the demodulation frequency in each stylus sensing frame to set the demodulation frequency as f1−df, f1+2df, f1−2df, f1+3df, f1−3df, f1+4df. In this embodiment, the processor 101 may scan the demodulation frequency in both increasing and decreasing directions starting from the first frequency value. In other embodiments, the adjustment process may be varied. For example, the scan may be performed in only one-way, either increasing or decreasing, and started from a minimum or a maximum frequency, or. The scan of the first frequency may be carried on until the demodulated writing signal DWS with a maximum energy is found. The first frequency may be set to a frequency which demodulates the demodulated writing signal DWS having the maximum energy, so that a minimized mismatch between the first and second frequencies may be obtained.

Figure 5B:
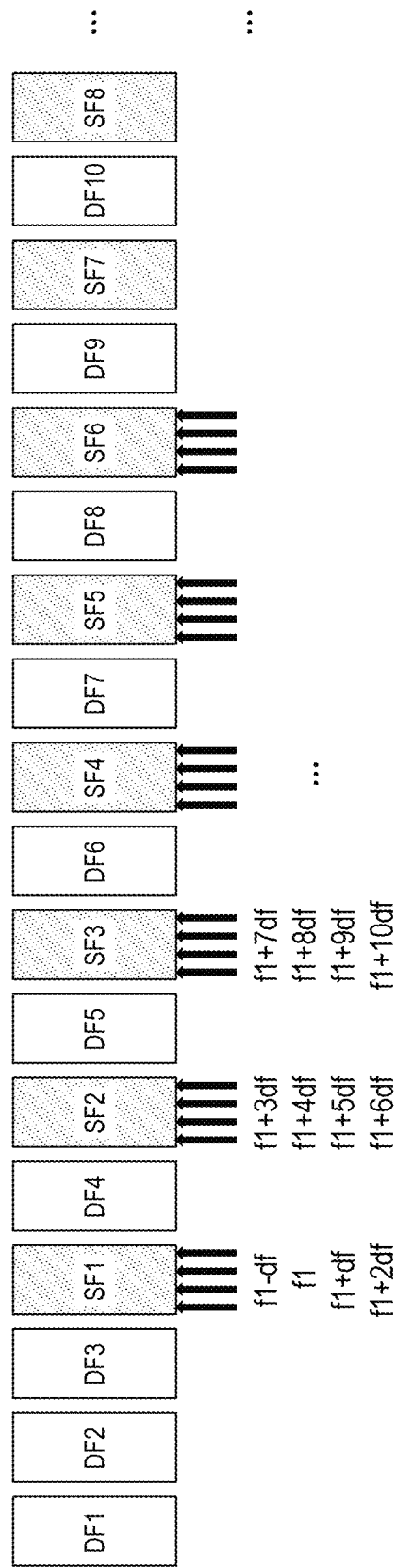
FIG. 5B illustrates a timing diagram of when the touch panel senses the writing signal WS in accordance with some embodiments of the present disclosure.

FIG. 5B illustrates a timing diagram of when the touch panel 10 senses the writing signal WS in accordance with some embodiments of the present disclosure. Similar to FIG. 5A, a plurality of display frames DF1-DF10 are sequentially arranged, while each of the stylus sensing frames SF1-SF8 are inserted between two display frames. The touch panel 10 is configured to display a corresponding image in each display frame and sense the writing signal and determine whether a writing event occurs in each stylus sensing frame.

In this embodiment, the processor 101 may apply more than one modulation frequencies to the receiver 100 in each stylus sensing frame. For example, in FIG. 5B, the processor 101 may set the first frequency as f1−df, f1, f1+df, f1+2df in the stylus sensing frame SF1, and as f1+3df, f1+4df, f1+5df, f1+6df, and so on. The scan for the demodulation frequency may be performed in an increasing or a decreasing direction.

FIG. 6A illustrates an energy spectrum diagram of the demodulated writing signal DWS demodulated by different demodulation frequencies in accordance with some embodiments of the present disclosure. In FIG. 6A, the vertical axis corresponds to the energy of the demodulated writing signal DWS, and the horizontal axis corresponds to the frequency value set for the demodulation frequency. Specifically, in this embodiment, the modulation frequency of the active stylus 11 is set at a frequency value f2, and the demodulation frequency of the receiver 100 is set at a frequency value f1. As can be seen in FIG. 6A, the energy of the demodulated writing signal DWS when the demodulation frequency is set at the first frequency value f1 is lower than that when the demodulation frequency is set at the second frequency value f2. In some embodiment, the deviation between the first frequency value and the second frequency value causes the processor 101 to adjust the demodulation frequency, aiming to increase the energy of the demodulated writing signal DWS, FIG. 6B illustrates how the demodulation frequency is scanned in accordance with some embodiments of the present disclosure. As described in paragraphs related to FIG. 5A, the demodulation frequency may be scanned in increasing and decreasing directions starting from the first frequency value f1 originally set. The scanning process of the demodulation frequency may be terminated once the demodulated writing signal DWS with the maximum energy is found.

In other embodiments, other algorithms used for scanning the maximum energy of the demodulation writing signal DWS may also be adopted. For example, any method of exhaustion, hill climbing, binary search, or inference using multiple points may used for scanning the maximum energy of the demodulation writing signal DWS.

FIG. 6C illustrates how the first frequency f1 is adjusted in accordance with some embodiments of the present disclosure. In this embodiment, after the demodulated writing signal DWS with the maximum energy is found when the demodulation writing signal DWS is set substantially at or close to the second frequency value f2, the processor 101 may be configured to control the receiver 100 to set the demodulation frequency at the second frequency value f2 accordingly for obtaining the demodulated writing signal DWS with the maximum energy.

FIG. 6D illustrates how the second frequency f2 is adjusted in accordance with some embodiments of the present disclosure. In this embodiment, instead of adjusting the demodulation frequency, the processor 101 may also be configured to inform the active stylus 11 to adjust the modulation frequency. Specifically, after the demodulated writing signal DWS with the maximum energy is found when the demodulation writing signal DWS is set substantially at or close to the second frequency value f2, the processor 101 may determine that there is mismatch between the modulation and demodulation frequencies. To adjust the modulation frequency, the processor 101 may be configured to sent an adjusting request along with the first frequency value f1 to the active stylus 11, allowing the active stylus 11 to set the modulation frequency as the first frequency value f1. In this way, as shown in FIG. 6D, the energy spectrum of the demodulation writing signal DWS may be right-shifted and centered at the first frequency value f1, allowing the receiver 100 to obtain the demodulated writing signal DWS with the maximum energy. In some other embodiments, the processor 101 may also be configured to provide a frequency difference between the first frequency value f1 and the second frequency value f2 to the active stylus 11, so that the active stylus 11 may be configured to fine tune the modulation frequency using the frequency difference.

In step S43, the processor 101 is configured to perform the control operation according to the determined writing event and a coordinate information at the point where the writing signal is received. Specifically, after the demodulated writing signal DWS is verified as normal in step S41 or the demodulation frequency is adjusted in S42, the touch panel 10 may function properly to perform control operations instructed by the active stylus 11. The processor 101 may be configured to perform corresponding operations according to the determined touch event and the In summary, the electronic system and the control method provided the present disclosure may be used to determine whether the demodulated writing signal is abnormal resulted from mismatch between the modulation and demodulation frequencies. Proper adjustments may be performed to match the modulation and demodulation frequencies, so the energy level of the demodulated writing signal may be increased, thereby improving accuracy and sensitivity on touch controls from the active stylus.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A control method for a touch panel to receive controls from an active stylus, the control method comprising:
   using a demodulation frequency to demodulate a writing signal received from the active stylus;
   determining whether a demodulated writing signal is abnormal or not; and
   in response to determining the demodulated writing signal to be abnormal, adjusting the demodulation frequency to increase an energy of the demodulated writing signal.

2. The control method of claim 1, wherein the writing signal is modulated with a modulation frequency, and in response to determining the demodulated writing signal to be abnormal, the demodulation frequency is adjusted to substantially match or close to the modulation frequency.

3. The control method of claim 1, wherein the energy of the demodulated writing signal is compared to a threshold energy, and
   when the energy of the demodulated writing signal is greater than or equal to the threshold energy, a writing event indicating that the active stylus is touching the touch panel is determined.

4. The control method of claim 3, comprising:
   receiving a contact signal provided by the active stylus indicating whether the active stylus touches the touch panel; and
   determining whether the demodulated writing signal is abnormal according to the contact signal.

5. The control method of claim 4, wherein when the energy of the demodulated writing signal is less than the threshold but the contact signal indicates that the active stylus touches the touch panel, the demodulated writing signal is determined to be abnormal.

6. The control method of claim 3, wherein the demodulation frequency is adjusted to a frequency that the demodulated writing signal has a maximum energy.

7. The control method of claim 3, wherein the demodulation frequency is adjusted using a method of exhaustion, hill climbing, binary search, or inference using multiple points.

8. The control method of claim 1, wherein in a stylus sensing frame time, the first frequency is set to one or more testing frequencies to demodulate the writing signal.

9. A touch panel, adapted to receive control from an active stylus, the touch panel comprising:
   a receiver configured to:
     use a demodulation frequency to demodulate a writing signal received from the active stylus; and
   a processor coupled to the receiver and configured to:
     determine whether a demodulated writing signal is abnormal or not; and
     in response to determining the demodulated writing signal to be abnormal, adjust the demodulation frequency to increase an energy of the demodulated writing signal.

10. The touch panel of claim 9, wherein the writing signal is modulated with a modulation frequency, and in response to determining the demodulated writing signal to be abnormal, the processor is configured to adjust the demodulation frequency to substantially match or close to the modulation frequency.

11. The touch panel of claim 9, wherein the processor is configured to:
   compare the energy of the demodulated writing signal is with a threshold energy, and
   when the energy of the demodulated writing signal is greater than or equal to the threshold energy, the processor is configured to determine a writing event indicating that the active stylus is touching the touch panel.

12. The touch panel of claim 11, the processor is configured to:
   receive a contact signal, through the receiver, provided by the active stylus indicating whether the active stylus touches the touch panel; and
   determine whether the demodulated writing signal is abnormal according to the contact signal.

13. The touch panel of claim 12, wherein the processor is configured to determine the demodulated writing signal is determined to be abnormal when the energy of the demodulated writing signal is less than the threshold but the contact signal indicates that the active stylus touches the touch panel.

14. The touch panel of claim 11, wherein the processor is configured to adjust the demodulation frequency to a frequency that the demodulated writing signal has a maximum energy.

15. The touch panel of claim 11, wherein the processor is configured to adjust the demodulation frequency using a method of exhaustion, hill climbing, binary search, or inference using multiple points.

16. The touch panel of claim 9, wherein the processor is configured to set the first frequency to one or more testing frequencies to demodulate the writing signal in a stylus sensing frame time.

* * * * *